3,039,529
SECONDARY RECOVERY OF PETROLEUM
Keith R. McKennon, Concord, Calif., assignor to The Dow Chemical Company, Midland, Mich., a corporation of Delaware
No Drawing. Filed May 19, 1959, Ser. No. 814,165
5 Claims. (Cl. 166—9)

This invention relates to the secondary recovery of petroleum and is particularly concerned with an improved water-flooding process for recovering petroleum from subterranean formations.

In the secondary recovery of petroleum by water-flooding, it has been proposed to employ aqueous media rendered more viscous than ordinary water or brine by the incorporation therein of water-soluble agents such as water-soluble polymers. In one such procedure it has been proposed to employ acrylamide polymers hydrolyzed to the extent of between about 0.8 and about 10 percent of the amide groups. However, it has been discovered that such partially hydrolyzed acrylamide polymers having 10 percent or less of the amide groups hydrolyzed to carboxyl groups have certain drawbacks in actual use. Thus, for example, it has been found that acrylamide polymers having 10 percent or less of the amide groups converted to carboxyl groups are strongly adsorbed by mineral constituents of oil sands and are progressively removed from the flooding liquid when such liquid is contacted with the underground strata. This property of said acrylamide polymers requires that much expensive polymer be pumped into the formation merely to satisfy the adsorption requirements of the producing strata.

Similarly, water-soluble polyacrylates and polyacrylic acid have been suggested as agents to render water more viscous for secondary recovery of petroleum. However, such agents precipitate in brines containing calcium and sodium ions such as are generally encountered in the producing strata.

In accordance with the present invention, it has been discovered that water-soluble, high molecular weight, hydrolyzed polyacrylamides, having from 12 to about 67 percent of the original carboxamide groups hydrolyzed to carboxyl groups, have particularly advantageous properties for preparing viscous aqueous compositions for use in the secondary recovery of petroleum. Thus, the present invention embodies a method of improving the sweeping or driving of petroleum from underground formations through the use of aqueous compositions rendered more viscous by the incorporation therein of hydrolyzed polyacrylamides containing from 12 to about 67, and preferably from 12 to about 45, mole percent of acrylic acid moieties in combined form in the molecule. It is among the advantages of the invention that the above described polymers are adsorbed in underground strata to only a minimal extent. It is a further advantage of the invention that said hydrolyzed polyacrylamides are not rendered insoluble by the presence in the solution of concentrations of calcium ions and sodium ions such as are commonly encountered in oil field brines. Yet another advantage of the invention resides in the fact that only very small amounts of the high molecular weight, hydrolyzed polyacrylamides are required to achieve high viscosities in the fluid employed for driving the oil.

The hydrolyzed polyacrylamides employed in the present invention are water-soluble, substantially free of cross-linking between polymer chains and have from 12 percent to about 67 percent, and preferably from 12 to about 45 percent, of the carboxamide groups originally present in the polyacrylamide hydrolyzed to carboxyl groups. The term "hydrolyzed polyacrylamide," as employed herein, is inclusive of the modified polymers wherein the carboxyl groups are in the acid form and also of such polymers wherein the carboxyl groups are in the salt form, provided that the salts are water-soluble. Thus, for example, the hydrolyzed polyacrylamides may be employed in the form of sodium, potassium or other alkali metal salt, the ammonium salt or mixed salts of sodium, potassium, magnesium, calcium, and the like. Salts of polyvalent ions, such as iron and aluminum, are to be avoided for reasons of insolubility. The polyacrylamides, from which the hydrolyzed polyacrylamides of the invention are derived, may be homopolymers of acrylamide or copolymers thereof with up to about 10 percent by weight of other suitable polymerizable vinyl compounds such as vinyl acetate, acrylonitrile, methacrylonitrile, vinyl alkyl ethers, vinyl chloride, and the like, provided that the copolymers so employed are characterized by water-solubility and freedom from cross-linking as set forth above. Thus, the hydrolyzed polyacrylamides, as employed in the present invention may be represented graphically by the following general composition:

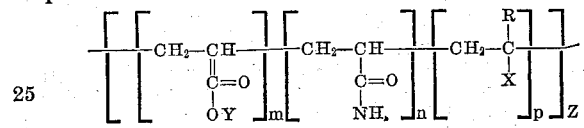

wherein Y represents hydrogen, ammonium, an alkali metal or an alkaline earth metal, R represents hydrogen or a methyl radical, X represents chlorine, a lower alkoxy or acyloxy group or a cyanide radical, $m$ ranges from 12 to 67, $n$ ranges from 33 to 88, $p$ ranges from 0 to 10 and the sum of $m$, $n$ and $p$ equals 100, and Z is at least about 60.

Further, the hydrolyzed polyacrylamides employed in accordance with the present invention are characterized by high molecular weight. As a result it is possible to obtain aqueous solutions having a desirably increased viscosity with the use of a minimum amount of the polymeric ingredient. The hydrolyzed polyacrylamides employed herein are characterized by a molecular weight of at least 500,000 and molecular weights of of 1,000,000 or more are preferred. The viscosity of a standard solution of polymer under controlled conditions is correlated with the molecular weight of the polymer. Accordingly it has been found that the hydrolyzed polyacrylamides suitable for use in the invention are those characterized by a viscosity of at least 6 centipoises for a 0.5 percent by weight solution thereof in aqueous 4 percent by weight sodium chloride solution at a temperature of 25° C. as determined with an Ostwald viscosimeter.

Acrylamide polymers may be prepared in known manner, as, for example, by heating acrylamide in aqueous solution with a peroxide catalyst such as an alkali metal persulfate or an organic hydroperoxide or by photopolymerizing acrylamide in aqueous solution with an activator such as riboflavin. The resulting polyacrylamide may be hydrolyzed in any suitable fashion, as, for example, by heating an aqueous solution of polyacrylamide with the appropriate amount of sodium hydroxide or other alkali metal hydroxide to produce the desired hydrolyzed polyacrylamide. The latter may be employed in the invention directly as produced in aqueous solution. Alternatively the hydrolyzed polyacrylamide may be dried and flaked or powdered as on a drum drier or the desired product may be precipitated from solution by addition of a water-miscible organic solvent such as methanol, ethanol or acetone.

In carrying out the invention, the hydrolyzed polyacrylamide is dissolved in water in any suitable fashion to provide a solution having the desired viscosity. Alternatively, the hydrolyzed polyacrylamide may be dissolved in brine or an aqueous solution of said polymer be diluted with brine to form a solution having ionic constituents similar or identical to those in the connate water in the oil field wherein the secondary recovery procedure is to be employed. In a preferred method of operation, the viscous solution, hereinafter identified as "pusher fluid," is prepared with oil field brine obtained from the producing strata or from strata adjacent to the producing strata whereby undesired changes in the strata by reason of introduction of the pusher fluid are minimized.

In such operations, the concentration of the hydrolyzed polyacrylamide in the water or brine employed to produce the pusher fluid may be adjusted to produce the desired viscosity of said fluid. In general, with the high molecular weight hydrolyzed polyacrylamides preferably employed, that is, with polymers having a molecular weight of at least 500,000, it is desirable to employ from about 0.01 to 0.5 percent by weight or more of hydrolyzed polyacrylamide in the pusher fluid. In practice, the pusher fluid may have a viscosity of from slightly over that of pure water (1.0 centipoise at 20° C.) to about 1000 centipoises and preferably from about 1.1 to 100 centipoises. The exact viscosity to be employed for maximum efficiency in recovery of oil will vary depending upon such factors as the porosity and permeability of the oil-bearing formation, the viscosity of the oil in the formation and the particular type of oil-bearing strata involved. In many cases, good results are obtained when the pusher fluid is adjusted to a viscosity ranging from about the viscosity of the oil in place in the producing strata to about ½ the viscosity of such oil.

In the final preparation of the pusher fluid for injection into the oil-bearing strata, it is generally essential that the pusher fluid be free of undissolved solids which may filter out and plug the face of the formation thus preventing further injection. Conventional filtration operations using a filter-aid such as diatomaceous earth will usually suffice to remove undissolved solids. Similarly, it is desirable to avoid constituents in the pusher fluid which may react with the oil bearing strata or the connate water therein, as for example, by the precipitation of inorganic salts in the pores of the formation. It is sometimes desirable to incorporate a sequestering agent such as citric acid or sodium ethylenediamine tetraacetate in the pusher fluid. Other conventional additaments such as antimicrobial agents to prevent the growth of microorganisms in the pusher fluid may also be incorporated. It is usually desirable to adjust the pH of the pusher fluid to approximately the pH of the connate water in the oil-bearing formation and in any case the pusher fluid should be maintained at a pH of from about 5 to 9 in order to avoid undesirable changes in the composition of the hydrolyzed polyacrylamide.

In any particular instance, the minimal concentration of hydrolyzed polyacrylamide required to provide effective sweeping of the oil from the formation may be ascertained by laboratory tests on core samples obtained from the field on which secondary recovery is contemplated. In general, it is desirable that such tests be run on several core samples to guard against variations normally encountered in such samples.

The following examples illustrate the invention but are not to be construed as limiting the same:

*Example 1*

To determine the loss of polymer by adsorption in the oil-bearing strata, solutions of various hydrolyzed polyacrylamides were pushed through unconsolidated cores prepared from California Miocene oil-sands. It was found that adsorption removed varying amounts of the polymer from the solution introduced into the core so that the first solution produced from the exit face of the core contained no polymer. As the polymer solution moved through the core, it was found that adsorption sites on the oil-sand became satisfied and the polymer then appeared in increasing concentrations in the effluent from the core. Passage of the polymer solution through each core was continued until adsorption sites on the oil-sand had been saturated and the polymer appeared in the effluent from the core as indicated by change in refractive index of said effluent, the latter being passed continually through a recording differential refractometer. When the polymer showed up in the effluent from a core, the input fluid to the core was shifted to aqueous 2.2 percent sodium chloride solution and passage thereof was continued until the refractometer indicated that no further amounts of polymer were being flushed from the core. This cycle of injection of polymer solution until show-up in the effluent followed by brine flushing was repeated with the same polymer on the corresponding core in each case. From the plots of refractive index versus volume of effluent solution for the two cycles the amount of polymer "held up" by adsorption in the core was calculated and is recorded in the following table as micrograms of polymer adsorbed per gram of oil sand. The results for a series of polyacrylamides having varying degrees of hydrolysis are set forth in the table, wherein the percent hydrolysis represents the percent of the carboxamide groups in polyacrylamide (homopolymer) replaced by sodium carboxylate groups. The hydrolyzed polyacrylamides were employed as filtered solution in aqueous 2.2 percent by weight sodium chloride at pH 7 and at the indicated concentration of polymer.

| Percent Hydrolysis | Concentration of Polymer, Percent by Weight | Micrograms of Polymer Adsorbed per Gram of Oil-Sand |
|---|---|---|
| 0.4 | 0.1 | 1260 |
| 1.7 | 0.1 | 770 |
| 4.4 | 0.1 | 475 |
| 8.2 | 0.1 | 150 |
| 12.3 | 0.1 | 58 |
| 26.4 | 0.1 | 31 |
| 30 | 0.1 | 25 |
| 30 | 0.052 | 25 |
| 37 | 0.052 | 24 |
| 55 | 0.052 | 28 |
| 67 | 0.05 | 32 |

Each of the polymers employed above was characterized by a viscosity of at least 8.4 centipoises for a 0.5 percent by weight solution thereof in aqueous 4 percent by weight sodium chloride solution at pH 7 and at 25° C.

*Example 2*

In determinations similar to those of Example 1, the porosities of the oil-sand cores were determined and corresponding pore volumes calculated. Solutions containing 0.1 percent by weight of various hydrolyzed polyacrylamides and 20 parts per million of potassium iodide tracer in aqueous 2.2 percent by weight sodium chloride solution were pushed through the cores, displacing 2.2 percent sodium chloride solutions without polymer or potassium iodide. Passage of the polymer solution through each core was continued until adsorption sites on the oil-sand had been saturated and the polymer appeared in the effluent from the core as indicated by change in refractive index of said effluent, the latter being passed continually through a recording differential refractometer. The tracer amount of potassium iodide dissolved in the polymer solution was used to indicate the passage of the non-adsorbed component of the solution through the core. Samples of effluent were periodically analyzed by conventional volumetric procedures for iodide ion content. When the polymer showed up in the effluent from a core, the input fluid to the core was shifted to aqueous 2.2 percent sodium chloride solution without polymer or potassium iodide and passage thereof was continued until the refractometer indicated that no further amounts of polymer were being flushed from the core. The difference between volume of polymer solution injected into the core when the first polymer appeared in the effluent, as indicated by a change of refractive index, and the volume of polymer injected when the first iodide ion appeared in the effluent served as a basis of calculating the volume of polymer solution "held up" by adsorption in the core. This adsorbed polymer is recorded in the following table as hold-up volume in terms of the corresponding number of pore volumes of polymer solution.

| Percent Hydrolysis of Polyacrylamide | Pore Volumes Hold-up of Polymer Solution |
|---|---|
| 4.4 | 2.1 |
| 8.2 | 0.51 |
| 12.3 | 0.075 |
| 19.6 | 0.08 |
| 26.4 | 0.1 |

*Example 3*

Hydrolyzed polyacrylamides of varying degrees of hydrolysis were dissolved in aqueous solutions containing varying concentrations of sodium chloride to produce a series of solutions containing 0.1 percent by weight of one of said hydrolyzed polyacrylamides. All said solutions were adjusted to a pH of 7. Measured volumes of each solution of the series were titrated with a standardized concentrated calcium chloride solution to the first appearance of a precipitate which failed to redissolve on agitation. The amount of added calcium chloride and the final volume of the titrated solution were determined and the concentrations of sodium chloride and of calcium ion (Ca++) at the precipitation point were calculated. Representative results are summarized in the following table wherein the concentrations of sodium chloride and of calcium ion are given for the precipitation point and the concentration of calcium ion is expressed as parts by weight of calcium ion per million parts of the final solution.

| Percent Hydrolysis of Polymer | Concentration of NaCl, percent by weight | Parts per Million of Calcium Ion |
|---|---|---|
| 64 | 8.7 | 6100. |
| 64 | 6.2 | 5100. |
| 55 | 7.8 | 17,500. |
| 55 | 5.7 | 19,000. |
| 41 | 0 to 10 | No ppt. |
| 37 | 0 to 10 | No ppt. |
| 30 | 0 to 10 | No ppt. |

The expression "No ppt." in the above table indicates that no precipitation occurred with the indicated polymers in solutions containing from 0 to 10 percent by weight of sodium chloride with the addition of up to 30,000 parts of calcium ion per million parts of solution.

By the above and further similar determinations, it was found that hydrolyzed polyacrylamides having degrees of hydrolysis of from 12 to 67 percent could be employed, without the deterrent effects of precipitation, to increase the viscosity of brines containing from 0.5 to 10 percent by weight of sodium chloride and over 100 parts of calcium ion per million parts of brine, the exact concentration of calcium ion tolerated varying in determinable manner with the degree of hydrolysis of the polymer. The determinations also demonstarted that it is preferable to employ polymers having a degree of hydrolysis of 45 percent or less when the polymer is employed in solutions containing relatively large concentrations of calcium ion, for example, concentrations of the order of 20,000 or more parts per million. It was further found that the precipitation point with calcium ion in brine solutions of polymer did not vary significantly with changes in concentration of the hydrolyzed polyacrylamide of from about 0.04 to over 0.8 percent by weight.

*Example 4*

A 30 percent by weight solution of purified acrylamide monomer was mixed with sufficient riboflavin and copper sulfate to provide 35 parts of riboflavin and 15 parts of copper ion per million parts of monomer in the solution. The resulting mixture was irradiated with a sun-lamp to induce photo-polymerization. The polymerized product was a viscous, gel-like solution. Portions of this product were dissolved in water to prepare a series of solutions containing 0.934 percent by weight of polymer. Each such solution was mixed with a different amount of sodium hydroxide and heated at a temperature of 90° C. for 5 hours to produce a series of hydrolyzed polyacrylamides having varying degrees of hydrolysis. One portion of the original polymer was retained without further treatment as an unhydrolyzed control. To the solutions containing the hydrolyzed polyacrylamides, hydrochloric acid was added and the solution was then poured into an equal volume of methanol to precipitate the polymer. The resulting precipitates were washed with anhydrous methanol and dried at 80°–90° C. Portions of each polymer product were analyzed for nitrogen content and the percent hydrolysis of carboxamide groups to carboxyl groups was calculated on the basis of the nitrogen analyses. The concentrations of original polymer, concentrations of sodium hydroxide after addition thereof and resulting degree of hydrolysis of product are summarized in the following table:

| Concentration of Polymer, Grams per Liter | Concentration of Sodium Hydroxide, Grams per Liter | Percent Hydrolysis |
|---|---|---|
| | Untreated | 0 |
| 9.34 | 0.424 | 13 |
| 9.34 | 1.70 | 30 |
| 9.34 | 2.97 | 37 |
| 9.34 | 6.78 | 55 |

Each of the above polymers was dissolved in aqueous sodium chloride solution and the pH thereof was adjusted to prepare a series of solutions containing 0.434 percent by weight of one of the polymers in aqueous 0.49 percent sodium chloride solution at a pH of 7. The viscosity of these solutions were determined by a a Brookfield viscosimeter with the appropriate spindle used at 6 revolutions per minute. The results are summarized in the following table.

| Percent Hydrolysis of Polymer | Viscosity, Centipoises |
|---|---|
| 0 | 8.5 |
| 13 | 16 |
| 30 | 48 |
| 37 | 62 |
| 55 | 125 |

The above determinations demonstrated the desirability of employing polyacrylamides having a significant degree of hydrolysis in order to obtain relatively high viscosity solutions with the least amount of poymer.

*Example 5*

Cylindrical cores were drilled from Berea sandstone representative of that found in oil fields and mounted in a holder arranged so that fluids moving through the cores were constrained to flow substantially parallel to the axis of the cylindrical cores. Each core had a diameter of 2.45 centimeters, a length of about 150 centimeters and a permeability to air of about 250 millidarcies. Each core was evacuated and flooded with a brine containing 3 percent by weight sodium chloride. Thereafter, the brine was driven out of the core with an oil having a viscosity of 48 centipoises. On one core, the oil was then driven out with brine. On the other core, the oil was driven out with a filtered solution of 0.05 percent by weight of hydrolyzed polyacrylamide in the same brine. This 0.05 percent solution had a viscosity of 1.2 centipoises at 25°

C. The hydrolyzed polyacrylamide employed had been prepared by hydrolyzing polyacrylamide with sodium carbonate, had a degree of hydrolysis of about 29 percent and was characterized by a viscosity of about 26 centipoises for a 0.5 percent by weight solution thereof in aqueous 4 percent sodium chloride solution at 25° C. The amount of oil and proportions of oil and water produced from the effluent from each core were recorded and are set forth in the following table wherein the oil recovery is in terms of percent produced from the core based on the amount of oil originally in the core, the term "breakthrough" refers to the point when brine first appeared in the effluent from the cores and the expression "Water Cut" is the percent by volume of brine in said effluent.

| Driving Fluid | Water, Cut Percent | Oil Recovery, Percent |
| --- | --- | --- |
| Brine | Breakthrough | 25.5 |
| | 36 | 32 |
| | 90 | 34 |
| | 97 | 37 |
| Brine plus 0.05 percent hydrolyzed polyacrylamide | Breakthrough | 45 |
| | 75 | 51 |
| | 90 | 62 |
| | 97 | 64 |

On the above sandstone it was found that the hydrolyzed polyacrylamide was adsorbed in the amount of 35 micrograms per gram of sandstone.

Other advantages of the high molecular weight, hydrolyzed polyacrylamides of the invention have been found in investigating the effects of temperature on the viscosity of aqueous solutions of these polymers. Thus it has been determined that for solutions of high molecular weight hydrolyzed polyacrylamides having molecular weights of 750,000 to 2,500,000 the viscosity decreased only by 17 to 25 percent when the solutions were heated from 20° C. to 60° C. In contrast, a solution of a polyacrylamide having a molecular weight of less than 500,000 showed a decrease in viscosity of 49 percent when heated through the same range.

I claim:

1. In a process for recovering petroleum from a subterranean oil-bearing formation which comprises introducing into an input well penetrating said formation a flooding medium comprising an aqueous solution of a water-soluble organic polymer and forcing said medium through said formation towards at least 1 output well penetrating said formation at a distance from said input well, the improvement which consists in employing as the water-soluble polymer a high molecular weight, hydrolyzed polyacrylamide having from 12 to about 67 percent of the original carboxamide groups hydrolyzed to carboxyl groups.

2. The process of claim 1 wherein the hydrolyzed polyacrylamide is characterized by a viscosity of at least 6 centipoises for a 0.5 percent by weight solution thereof in an aqueous 4 percent by weight sodium chloride solution at a temperature of 25° C. at determined with a Ostwald viscosimeter.

3. The process of claim 1 wherein the hydrolyzed polyacrylamide has from 12 to about 45 percent of the original carboxamide groups hydrolyzed to carboxyl groups.

4. The process of claim 1 wherein the hydrolyzed polyacrylamide is employed in the amount of from about 0.01 to about 0.5 percent by weight of the flooding medium.

5. A process which comprises the steps of forming a flooding medium by dissolving from about 0.01 to about 0.5 percent by weight of a water-soluble, high molecular weight hydrolyzed polyacrylamide in an aqueous medium having substantially the same content of ions as the connate water in a subterranean oil-bearing formation, said hydrolyzed polyacrylamide being characterized by a viscosity of at least about 6 centipoises for a 0.5 percent by weight solution thereof in an aqueous 4 percent by weight sodium chloride solution at 25° C. and being further characterized by a content of carboxamide groups and carboxyl groups in the ratio of not less than 1 carboxamide to 2 carboxyls and not more than 7 carboxamides to 1 carboxyl, filtering the resulting solution to remove suspended insoluble matter, introducing the resulting flooding medium into an input well penetrating said formation and communicating therewith, forcing said flooding medium through said formation toward at least one output well penetrating said formation at a distance from said input well and recovering oil from said output well.

References Cited in the file of this patent

UNITED STATES PATENTS

| | | |
| --- | --- | --- |
| 2,152,779 | Wagner et al. | Apr. 14, 1939 |
| 2,827,964 | Sandiford et al. | Mar. 25, 1958 |
| 2,842,492 | Engelhardt | July 8, 1958 |
| 3,002,960 | Kolodny | Oct. 3, 1961 |

UNITED STATES PATENT OFFICE

CERTIFICATE OF CORRECTION

Patent No. 3,039,529                      June 19, 1962

Keith R. McKennon

It is hereby certified that error appears in the above numbered patent requiring correction and that the said Letters Patent should read as corrected below.

Column 5, line 59, for "100" read -- 1000 --; column 8, line 12, for "at", second occurrence, read -- as --.

Signed and sealed this 5th day of March 1963.

SEAL)
Attest:

STON G. JOHNSON                          DAVID L. LADD
Attesting Officer                            Commissioner of Patents